July 9, 1968  B. G. GLASS  3,391,869
VARIABLE CONE AREA CONVERGENT-DIVERGENT NOZZLE SYSTEM
Filed May 23, 1965  8 Sheets-Sheet 1

INVENTOR.
B. G. GLASS
BY
George E. Pearson
ATTORNEY

July 9, 1968 B. G. GLASS 3,391,869
VARIABLE CONE AREA CONVERGENT-DIVERGENT NOZZLE SYSTEM
Filed May 23, 1965 8 Sheets-Sheet 2

INVENTOR.
B. G. GLASS
BY
George E. Pearson
ATTORNEY

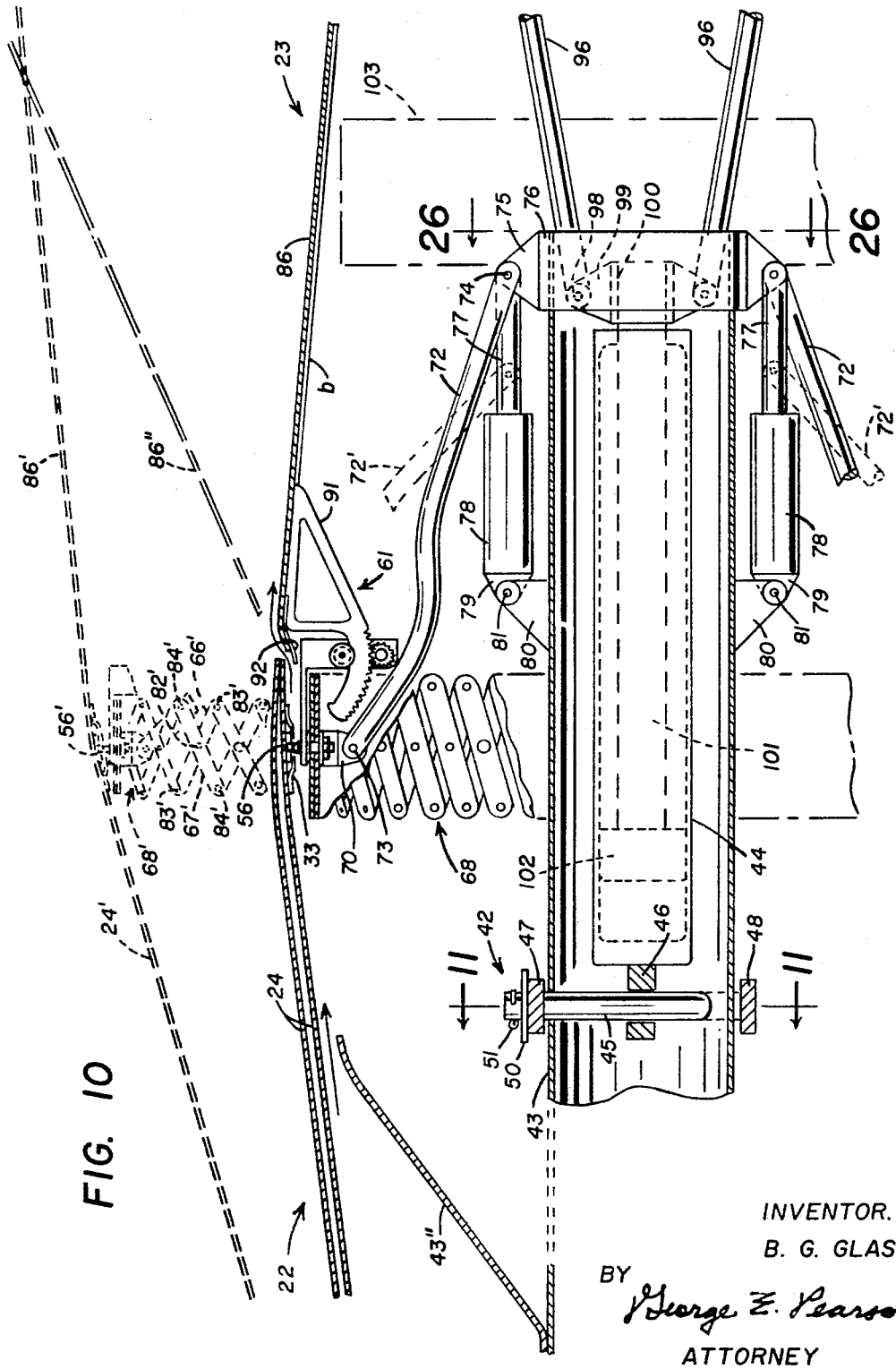

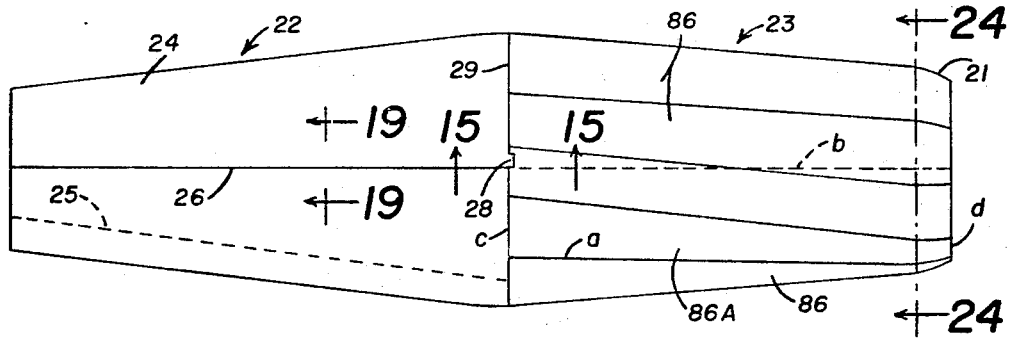
FIG. 14
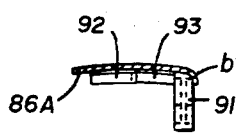
FIG. 23
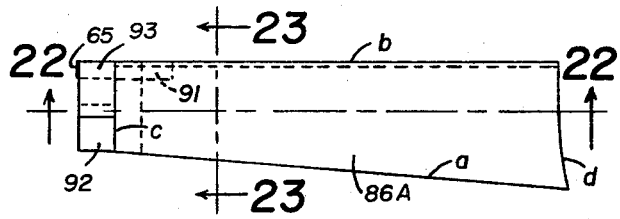
FIG. 21
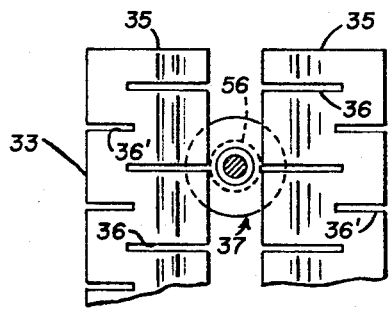
FIG. 16
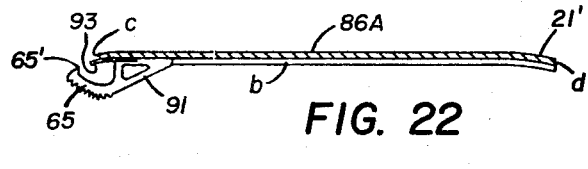
FIG. 22
FIG. 17
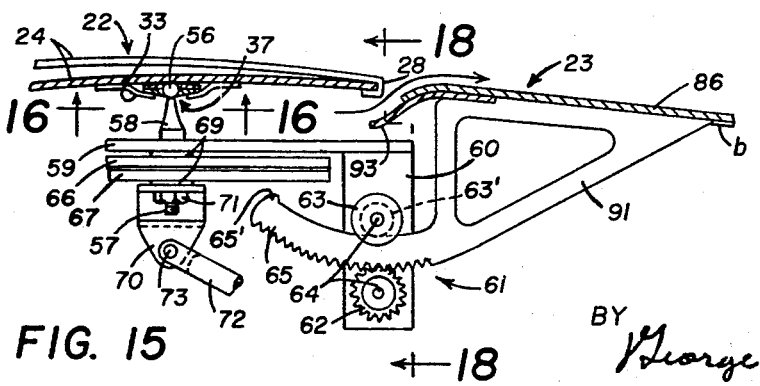
FIG. 15
INVENTOR.
B. G. GLASS
BY George E. Pearson
ATTORNEY

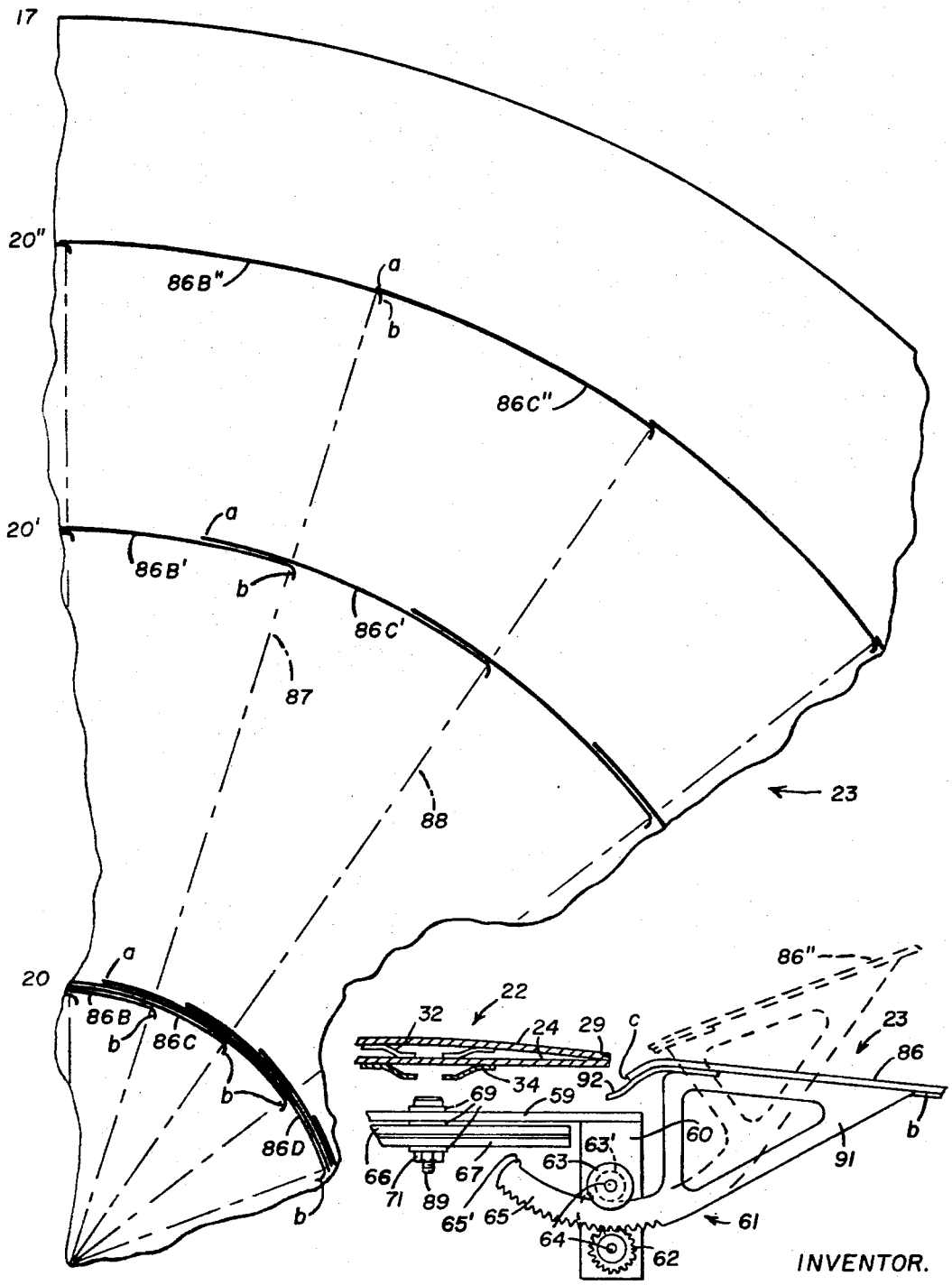

3,391,869
VARIABLE CONE AREA CONVERGENT-
DIVERGENT NOZZLE SYSTEM
Benjamin G. Glass, San Diego, Calif., assignor to Rohr Corporation, Chula Vista, Calif., a corporation of California
Filed May 23, 1966, Ser. No. 552,199
18 Claims. (Cl. 239—265.19)

This invention relates generally to so called variable area devices for modulating the flow of an efflux as in the air intake or nozzle exit of a jet propulsion system for aircraft. More particularly, the present invention is directed to new and improved methods and apparatus for providing independent nozzle flow area modulation at both the throat and exit of a convergent/divergent nozzle system.

Jet engine propulsion nozzles convert the total energy of the efflux gas emitting from the turbine toward a maximized kinetic energy at the nozzle exit. Since the reaction momentum generated is the product of mass flow times the velocity of the gas, if the gas is properly expanded, the thrust generated is increased accordingly. Nozzle area modulation makes it possible to obtain the maximum gas kinetic energy conversion. The optimized utilization of this available kinetic energy makes it possible to optimally meet varying flight conditions such as changes in the aircraft velocity and altitude.

A convergent nozzle with moderate exit area modulation suffices for subsonic and low supersonic flight performance, the efflux gas passing through the convergent nozzle being accelerated to critical velocity (Mach 1) only at the emission plane of the nozzle. For flight performance of approximately Mach 1.5 and above, however, a convergent/divergent nozzle must be employed for efficient performance, this being accomplished by fitting a carefully designed divergent section to the convergent nozzle employed at the lower velocities, hence the expression convergent/divergent nozzle system.

At the higher flight velocities, considerably more tail pipe gas pressure results from the ram effect of the free stream air. In the absence of a divergent nozzle section, this increased pressure energy would be somewhat wasted due to non optimum expansion. By use of the convergent/divergent nozzle system all of this ram pressure is recovered and converted to useful thrust, and resulting exit flow on typical advanced aircraft designs may exceed Mach 2 to 3 or more depending on vehicle velocity. Accordingly, flight vehicles may thus be provided having higher speeds, longer range capabilities, and overall marked increase in propulsion efficiency.

It has been found in practice that a reentrant contoured divergent section affords greater effective exit gas Mach number enhancement than a straight divergent cone with no means of correction of nonaxial flow. It has the added advantage of achieving the gas expansion in a shorter distance to thus effect economies in weight. A convergent/divergent nozzle having its divergent section shaped in this maner is well known, and referred to hereinafter as a reentrant DeLaval type nozzle configuration.

Efficient utilization of the increased exit gas Mach number resulting from ram pressure recovery in association with a reentrant DeLaval type nozzle requires incremental area variation or modulation of the flow at both the nozzle throat and exit in accordance with the operating Mach number and engine gas flow of the high speed aircraft. Optimized performance at applicable aircraft altitude and Mach number variations, for example, may require final exit diametrical expansion ratios as much as 1:4 and throat diametrical expansion ratios of about 1:15 to 1.8. Optimized nozzle throat and exit flow modulation may thus give efficiency improvement to all flight phases, and will avoid inefficient use of the propulsion energy.

Jet engines heretofore employing a convergent/divergent type nozzle system have been unable to take full advantage of the features afforded thereby. In certain prior art arrangements, for example, area variation at each of the nozzle throat and exit has been attempted by the use of separate inner and outer nozzles each formed of hinged conical overlapping segmental leaves. The overlapping segmental leaves are caused to expand or contract in the manner of a camera iris to thus cause the throat and exit areas to increase or decrease as required while retaining the circular nozzle cross section in each case. Such arrangements unduly increase the weight of the nozzle and are often limited to exit diametrical expansion ratios of less than 1:2 due to geometry and Beta angle considerations, that is, structural and aerodynamic difficulties. Beta angle is defined as the optimum ½ angle of flow divergence obtainable without flow separation. Sealing of the segments, moreover, becomes a major problem as the geometrical changes incurred for varying positions of each segment make continuous gas-tight abutments very difficult. Intersegment gas leakage is more critical on an external duct diameter then is the case on similar devices used on internally modulated devices as is explained later.

In general, exit area modulation performed on the external nozzle peripheral surface or duct requires heavy construction and an elongated envelope.

Such construction comprises many excrescences due to overlapping surfaces, and such excrescences result in poor duct conditions for high velocity flow. External nozzle surface modulation also presents sealing problems in avoiding the leakage of external hot gas into the nacelle, and presents problems in the avoidance of base drag due to difficulties in matching the variable area outer nozzle surface to the diameter and terminal end of the fuselage skin.

In other prior art arrangements, area modulation at the nozzle throat has been accomplished by the use of ejector and induced air, or by impinging a separate gas flow around the throat periphery, to thus aerodynamically reduce the nozzle throat diameter. In still other arrangements, an axially translatable convergent/divergent plug or separate nozzle is mounted coaxially with the fixed outer nozzle duct to obtain area changes at the throat as the plug is axially displaced variously with respect thereto. Such methods, obviously, do not meet the aforestated requirement for independent nozzle area variation at both the throat and exit. Independent translating plugs could be employed for the throat and exit. Such an arrangement, however, necessitates an inordinately elongated nozzle configuration which is not a practical solution.

In accordance with the arrangement of the present invention, modulation for nozzle area variation between extreme positions is accomplished simultaneously and independently at the throat and exit for the convergent/divergent nozzle system. Fore and aft transition in the modulation duct from entry at the engine tail cone to nozzle exit is accomplished with a gradual and smooth transition in all degrees of modulation.

Area modulation is accomplished by means of an expandable inner twin-cone surface and a fixed or constant profile external nozzle surface or duct to thus obviate the hot gas leakage, drag, and weight problems and the area expansion limitations of the prior art devices and arrangements. The nozzle, moreover, is of the reentrant DeLaval configuration to thus effect the desired weight and length economies as well as to effect the maximum pressure and velocity recovery obtainedable from such a configuration. The expandable twin-cone inner nozzle surface, furthermore, provides a diametrical expansion ratio of approximately 1:4 at the exit and approximately 1:1.8 expansion at the throat while additionally providing internally for the passage of cooling air from a pressure source such as a turbofan.

These and other features and advantages of the present invention follow from the novel construction and arrangement of coupled twin-cone forward and rear cone structures presently to be described which meet in the plane of the nozzle throat and coacting together provide the aforementioned expandable twin-cone inner nozzle surface. In accordance with this construction and arrangement, an upstream, or forward cone structure is provided in the form of a sheet metal blanket having longitudinally disposed overlapping edge portions providing for diametrical and circumferential expansion of the cone in the throat plane. The forward cone has its upstream end disposed for limited axial movement within the tail cone of the engine to thus receive the cooling air for the twin-cone skins and structure. The engine cone also provides a convenient support and torque reaction structure for the area modulating front cone to prevent rotation thereof at its most forward extremity. Notwithstanding this modulation there is thus provided a smooth and essentially unitary and continuous blanket surface between the engine tail cone and nozzle throat which is ideal for high velocity gas flow.

The forward cone is supported for circumferential expansion of its downstream end by a ring tongs (an endless version of a laxy tongs) with which it makes ball-disc-track connections at a plurality of circumferentially spaced points to provide for unwrapping of the end portions of the blanket as the ring tongs increases circumferentially. The blanket is hold against rotation at both its forward and aft extremities and along its longitudinal center while being permitted a limited degree of axial movement, as aforementioned, to facilitate such unwrapping movement as is required within the engine tail cone and to enable the downstream end of the blanket to follow the essentially right angular radial expansion of the ring tongs with respect to the nozzle axis. As otherwise expressed, the ring tongs is constrained to move within a plane normal to the nozzle axis and the downstream end of the forward cone is thus held in the throat region of the nozzle during expansion and contraction of the cone.

The downstream or rear cone structure is coupled to the forward cone and partakes of its radial and circumferential expansion and contraction. The rear cone is comprised of a plurality of overlapping, longitudinally extending leaf segments or petals each of which has a novel centerless hinge connection with the ring tongs support for the forward cone. The downstream end of the rear cone similarly has a ring tongs support, each petal having a ball and socket type connection at one of the pivotal points of the lazy tongs structure.

The ring tongs fore and aft, that is, for the forward and rear cones, respectively, inherently have their pivot points expanded and contracted radially, without rotation, as the endless lazy tongs structure is expanded and contracted circumferentially. Thus, each petal of the rear cone is constrained for movement within a radial plane extending fore and aft by its ring tongs support fore and aft. The petals therefore follow readily the unwrapping expansion of the blankets as the petals hinge upon their forward connections and pivot at their ball and socket connections at the downstream end of the rear cone. Intermediately positioned ring tongs between the forward and aft extremities of the rear cone for additional structural support of the petals are easily accommodated, if required.

By reason of this construction and arrangement of the petals, the same are readily moved within their radial planes to give the rear cone a configuration ranging from convergent in the closed or most fully overlapping condition of the petals to divergent in the open or least overlapping relation of the adjacently disposed petals. To this end, the petals are progressively widened from fore to aft to thus provide for a continuous overlap between the extreme closed to open positions at the downstream end of the rear cone notwithstanding that the diametrical expansion ratio may be of the order of upwards of 1:4. It will further be understood that this expansion is possible at the downstream end of the rear cone whether or not the upstream end of the cone is expanded in association with the forward cone.

The thin sheet metal blanket and petals are readily constrained by their ring tongs supports to bend and arc, as required, notwithstanding contraction and expansion of the cones to provide matching conformance with the profile and circular cross section of the fixed outer surface of the reentrant De Laval type nozzle. The blanket and/or petals, of course, may be preformed, as desired, to implement the changes in radius of curvature required for the full range of expansion and contraction.

In some cases the rear cone may be constructed, generally as a blanket, similar to the front cone. Likewise, the forward cone could be made in leaf segments with separate pivotal connections at the engine tail cone. In other cases, the sheet metal leaf or petal construction may be replaced by semirigid sandwich construction with the number of leaves increased to accommodate the varying curvature requirements and lack of flexure. Cooling air passages would be provided by the longitudinally extending cells in the sandwich construction.

The ring tongs movement lends itself readily to the application of radial forces thereto for actuation of the cones to effect the desired area modulation at the exit and/or throat of the nozzle, and the invention contemplates the use of sensors operable in conjunction with the engine fuel and intake air pressure monitoring for controlling the cone actuators to establish the appropriate flow areas in the nozzle.

An object of the present invention therefore is to provide improvements in the area flow modulation of convergent/divergent nozzle systems, particularly with respect to those having reentrant DeLaval type configuration, thereby to effect economies in nozzle weight and length as well as to provide performance efficiency improvements in all flight phases.

Another object is to provide novel methods and apparatus for modulating the area flow of convergent/divergent nozzle systems to extend the speed and range of existing Mach 1.5 plus aircraft aspirating propulsion systems such as employed on the F111, A11, YF12, F4 and F104 fighters and the B58 bomber.

Another object is to provide independent area flow modulation at both the throat and exit of a convergent/divergent nozzle system while maintaining a fixed or constant outer nozzle profile, and operable to provide a diametrical expansion ratio of upwards of 1:4 at the exit and 1:1.8 at the throat.

Still another object is to provide the aforesaid independent throat and exit area flow modulation in association with a DeLaval or reentrant type nozzle configuration.

Yet another object is to provide an inner expandable twin-cone surface structure for a convergent/divergent nozzle system for effecting the aforesaid independent area flow modulation at the throat and exit of the nozzle.

A further object is to provide an inner twin-cone surface nozzle structure as aforedescribed for use with a turbofan engine and to utilize a proportion of the fan air to cool the twin-cone surfaces.

Yet a further object resides in the provision of twin-cone continuous surface construction having expansion capabilities as aforedescribed while also providing substantially obstruction free surfaces for the smooth flow of the expanding gases thereover.

Still a further object is to provide novel radially and circumferentially expandable and contractable supports for the twin-cone structures, such supports being adaptable for simple radial actuation to effect the desired independent area modulation at the nozzle throat and exit.

Still other objects, features and advantages of the present invention will become more fully apparent from the following detailed description of the best mode thus far advanced for carrying out the invention and for practicing the principles thereof, reference being had to the accompanying drawings wherein:

FIG. 10 is a fragmentary sectional view of the forward cone in coupled relation to a similar fragmentary section of the rear cone and in the position of the forward cone as viewed along the line 10—10 of FIG. 8;

Figure 1:
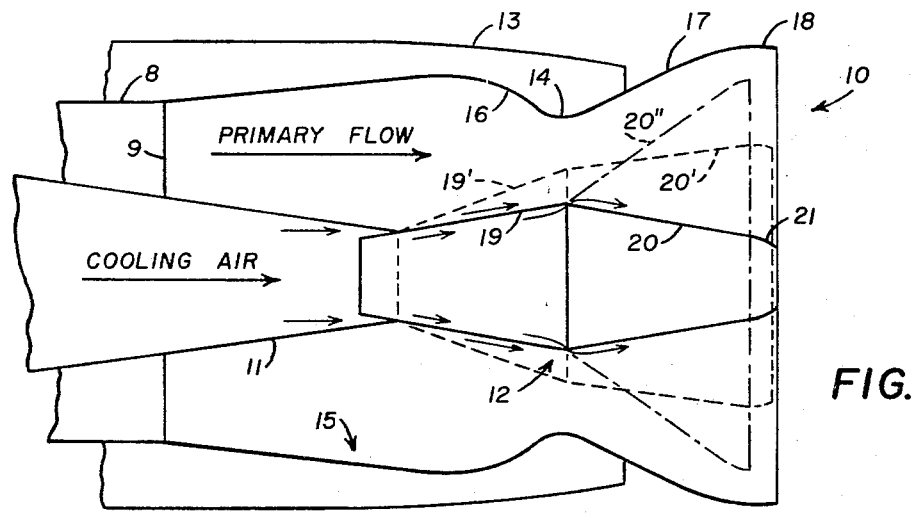
FIG. 1 is a diagrammatic profile view showing the twin-cone surfaces and expandable positions thereof in association with a reentrant DeLaval type nozzle configuration.
Figure 2:
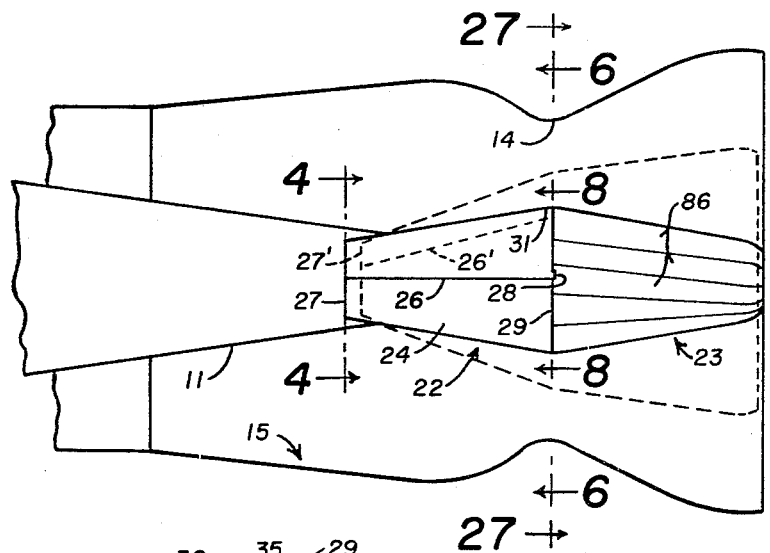
FIG. 2 is a view similar to FIG. 1 and showing structural details of the twin-cone surface construction, this being a plan view of the nozzle and engine as the same are mounted on the aircraft.
Figure 8:
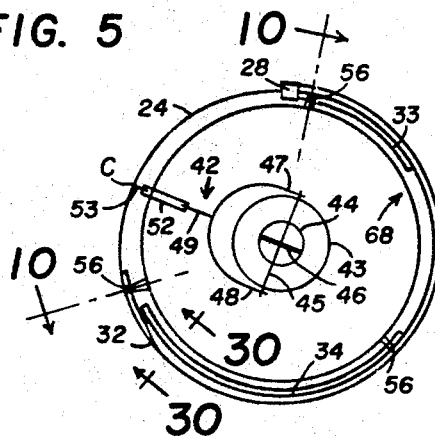
FIG. 8 is a semischematic end view of the forward cone as seen along the line 8—8 of FIG. 2 and rotated 90° clockwise.
Figure 11:
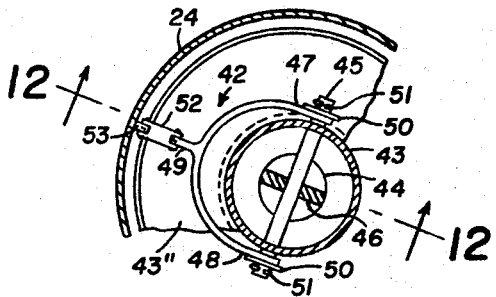
Figure 12:
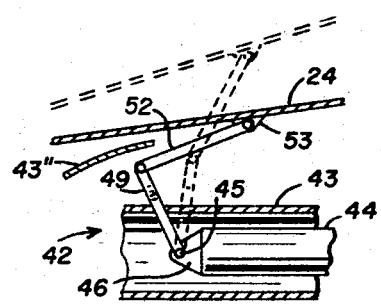
Figure 27:
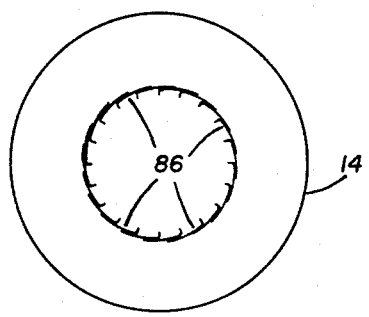
Figure 28:
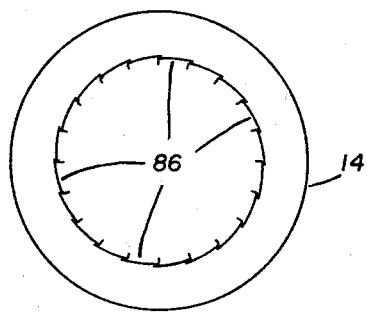
Figure 13:
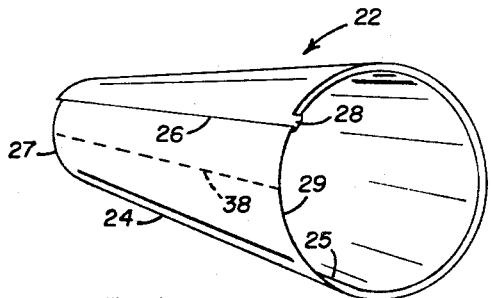
Figure 19:
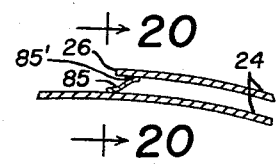
Figure 20:
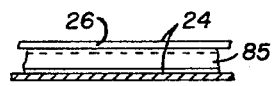
Figure 31:
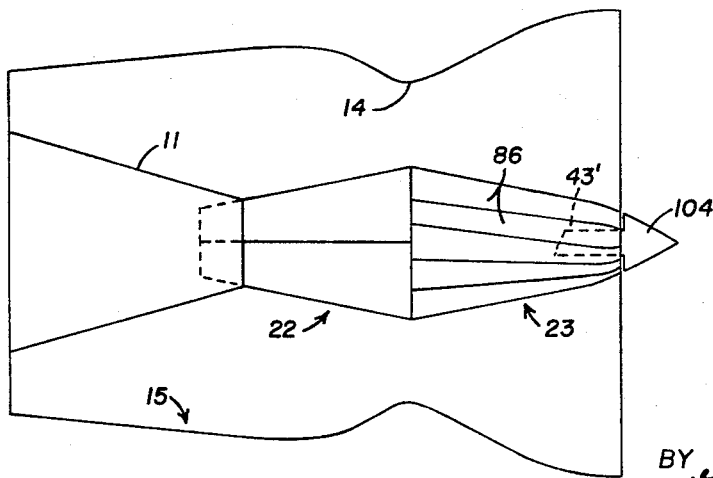
Figure 18:
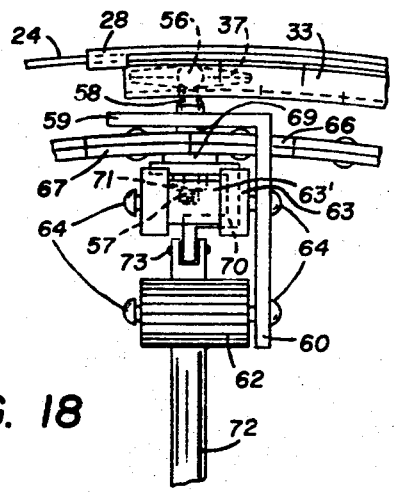
Figure 26:
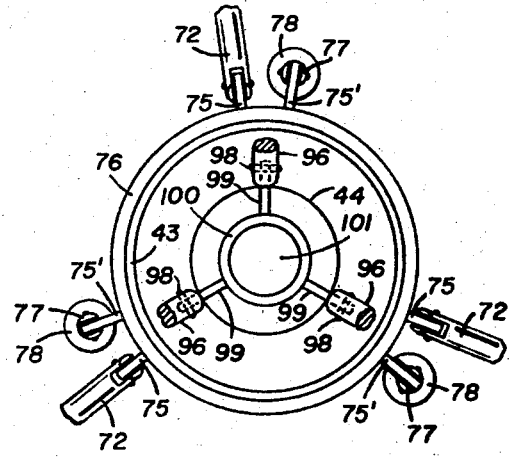
Figure 24:
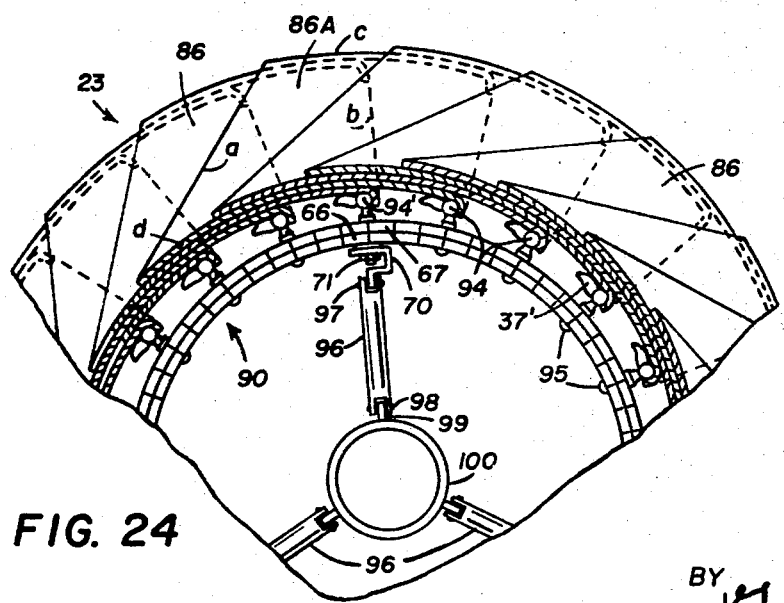
Figure 25:
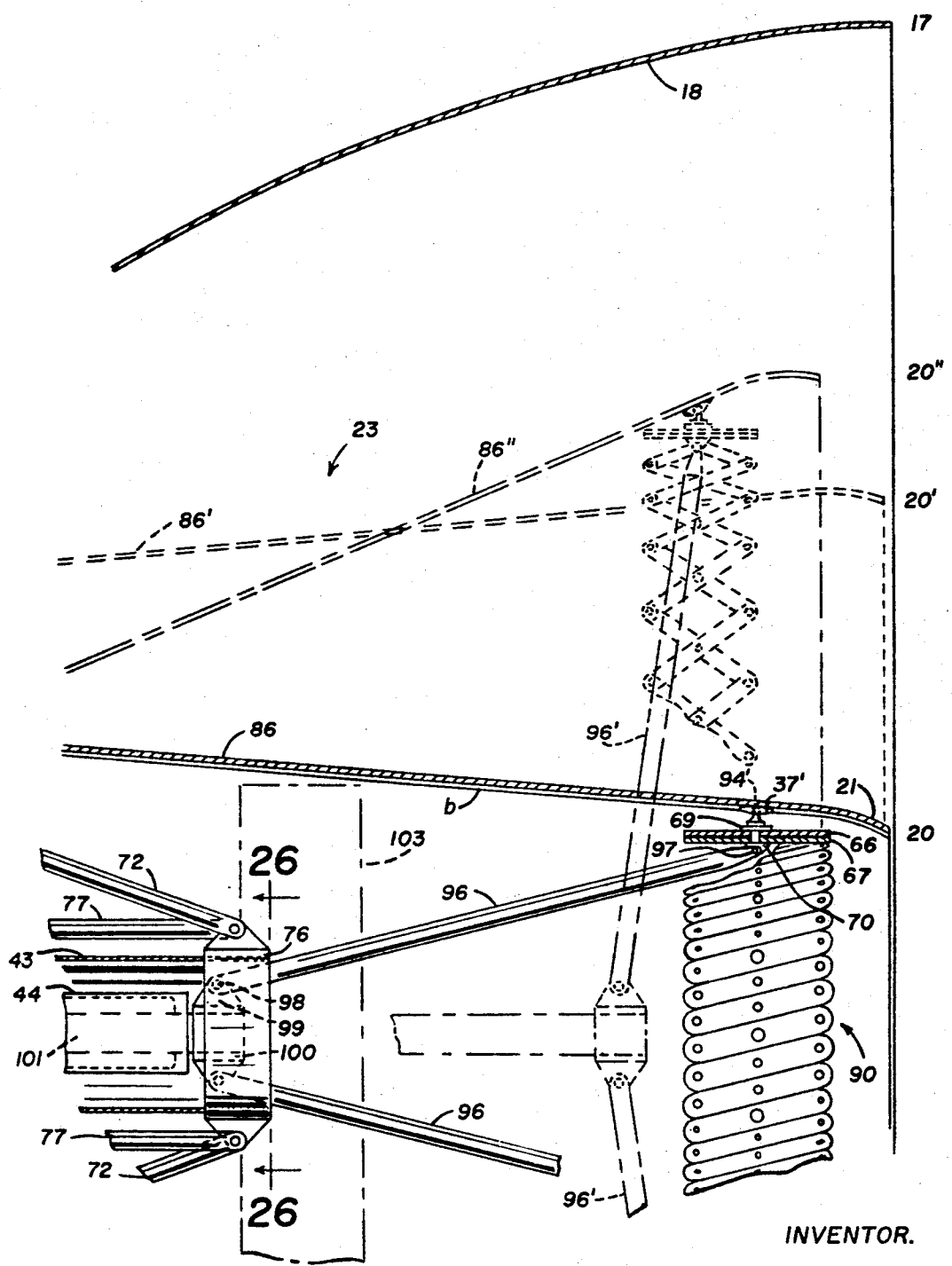

FIGS. 11 and 12 are sectional views taken respectively along the lines 11—11 of FIG. 10 and 12—12 of FIG. 11 and showing the antitorque hinge linkage employed at the downstream end of the forward cone blanket;

FIG. 13 is a view in perspective of the forward cone blanket;

FIG. 14 is a view somewhat enlarged of the twin-cone structure disclosed in FIG. 2;

FIG. 15 is a fragmentary sectional view of the blanket cone structure, somewhat enlarged, as viewed along the line 15—15 of FIG. 14;

FIG. 16 is a fragmentary view of the blanket track structure as viewed along the line 16—16 of FIG. 15;

FIG. 17 is a detail view, somewhat enlarged, of the track disc shown in FIG. 15;

FIG. 18 is a view of the ring tongs blanket support apparatus as viewed from line 18—18 in FIG. 15, the rear cone structure being removed;

FIGS. 19 and 20 are fragmentary sectional views, taken along the line 19—19 of FIG. 14 and the line 20—20 of FIG. 19 and showing the longitudinal blanket seal, the showing of FIG. 19 being somewhat enlarged from that of FIG. 14;

FIG. 21 is a detail view of a rear cone leaf showing the outside surface thereof;

FIG. 22 is a longitudinal sectional view of the leaf of FIG. 21 taken along the line 22—22 of FIG. 21;

FIG. 23 is a transverse sectional view of the leaf of FIG. 21 taken along the line 23—23 of FIG. 21;

FIG. 24 is a transverse sectional view of the rear cone as seen along the line 24—24 of FIG. 14 and showing the ring tongs support for the leaves of the rear cone;

FIG. 25 is a view similar to FIG. 10, somewhat reduced, and showing the downstream end portion of the rear cone structure in association with the reentrant portion of the outer nozzle;

FIG. 26 is a view of the actuator mechanism as viewed along the line 26—26 of FIGS. 10 and 25;

FIG. 27 is a diagrammatic end view of the upstream end of the rear cone shown in relation to the nozzle throat, as viewed along the line 27—27 of FIG. 2;

FIG. 28 is a view similar to FIG. 27 and showing the upstream end of the rear cone in its expanded position;

FIG. 29 is a fragmentary diagrammatic view of the downstream end of the rear cone and showing the spreading movement of the leaves as the end of the cone expands in relation to the exit end of the outer nozzle surface;

FIG. 30 is a fragmentary sectional view similar to FIG. 15, as viewed along the line 30—30 of FIG. 8; and FIG. 31 is a view similar to FIG. 1 and showing a nozzle variation employing a nozzle tail cone of fixed configuration.

Referring now to the drawings for a more complete understanding of the invention and first more particularly to FIG. 1, 10 generally designates a nozzle system which may, for example, form a part of an overall fan jet, turbo jet, or ram jet engine assembly. The engine, in each case, comprises a tail pipe 8 to which the nozzle 10 is attached peripherally as at 9 whereby the nozzle is aligned coaxially therewith. The tail pipe conveys the hot gases emitting from the engine proper to the nozzle 10 as indicated by the arrow associated with the legend Primary Flow. The tail pipe comprises an axially disposed engine tail cone 11 which is supported therefrom as by spoke structure, not shown. The tail cone provides an aerodynamic surface to assure smooth transition of the emitting gases through the nozzle. For purposes of this invention, the tail cone 11 also serves to convey cooling air, as indicated by the arrow associated with the legend Cooling Air, the cooling air being directed internally of the expandable twin-cone surface or duct generally designated 12. The cooling air may be supplied from the engine air intakes, from the fan section in the case of a turbo fan engine, or may be air bled from the primary compressor. The engine is enclosed within a body of good aerodynamic form such as the nacelle 13 which is conventional and terminates somewhat aft of the throat 14 in the fixed outer nozzle surface which is generally designated 15.

It will be understood that the aforedescribed engine design and configuration of FIG. 1 is disclosed by way of example only and as being exemplary of a suitable mode in which the principles of the present invention are operative. The engine cone 11, for example, would have a different conical confiuration if an afterburner were to be added to the engine. This, however, would in no way change the construction or modulation function of the expandable twin-cone surface 12 in association with the fixed outer nozzle surface 15.

For purposes of the present invention, the outer nozzle surface 15 has a reentrant DeLaval confiuration and comprises a convergent section 16 and a divergent section 17 which meet at the throat 14, the divergent section terminating in a reentrant exit portion 18.

The expandable twin-cone surface 12 is disposed coaxially with the DeLaval outer nozzle surface 15 and the two surfaces provide therebetween an annular passage for the flow of the hot gases through the nozzle. It is a purpose and function of the inner expandable nozzle surface 12 to modulate the cross sectional area of the gas flow independently at both the nozzle throat and exit. The surface 12 is made up of the twin-cone upstream and downstream surfaces 19 and 20, respectively, and is made to have an infinitely variable smooth flow transition between the extremities of its solid line position 19–20 wherein it has a divergent/convergent configuration, to the dashed line position 19'–20' and the solid dashed line position 19–20'' wherein, in each case of the latter two positions the twin-cone surface is generally divergent throughout the length of the twin-cone surface. In each of the positions 19–20, 19'–20' and 19–20'', the twin-cone surfaces 19 and 20 meet within the plane of the nozzle throat 14. The cone surface 20 has a downstream curved terminal portion 21 which conforms aerodynamically to the outer nozzle surface reentrant portion 18.

The twin-cone position 19–20 provides the maximum primary flow area at both the nozzle throat and exit and is the nozzle position used for obtaining maximum forward velocity of the aircraft. Position 19'–20' provides an intermediate modulated primary area flow at both the nozzle throat and exit and is exemplary of a modulation position for providing an economical cruising speed. Position 19–20" is exemplary of a modulation position suitable or take-off and loiter flight conditions. In this position, in contrast to positions 19–20 and 19'–20', sonic gas flow occurs only in the exit plane as a direct result of the lower effective gas pressure available with low speed flight and negligible ram recovery. Consequently, maximum throat duct and minimum exit areas are required as shown in the illustration.

Referring now more particularly to FIG. 2, it will be seen that the twin-cone surfaces 19 and 20 of FIG. 1 are embodied by forward and rear cone structures generally designated 22 and 23. The forward cone comprises a unitary sheet metal blanket 24 in the form of a conical wrap having overlapping edge portions and longitudinally extending inner and outer edges 25 and 26, respectively, of which edge 26 only appears in FIG. 2 (see FIG. 3, for example, showing of edge 25). Edge 26 lies in a vertical radial plane for the closed wrap position of blank 24 and presents the most favorable condition for the flow of the expanding gasses thereover. As the blanket unwraps and its downstream cross section area expands within the throat plane of the nozzle, the edge 26 moves out of the vertical radial plane somewhat and extends slightly angularly with respect thereto, as depicted by the dotted line position 26'. Blanket 24 also moves axially to some extent as the same expands within the engine tail cone 11, the upstream end 27 of the blanket, upon expansion, assuming the axially displaced position depicted by the dashed line 27'.

Blanket 24 has a turned under lip 28 which is disposed adjacent to outer blanket edge 26 and extends around the downstream edge 29 of the blanket and slidably under the inner wrap portion thereof. (See also FIGS. 3, 6–9, 13, 14, 15 and 18.) Lip 28 serves to hold the overlapping blanket edge portions together and in the desired circular cross section, as will more fully appear as the description proceeds. When fully unwrapped and layed out flat, blanket 24 and its lip 28 generally have the shape shown in FIG. 3, wherein it may also be seen that the blanket has spaced slits 30 which extend a short distance forward of its downstream edge 29. The slits 30 extend in spaced relation all along edge 29 to enable the blanket in its downstream edge portion 31, FIG. 2, to assume a reentrant shape adapted to merge smoothly with the outer surface of rear cone 23. To this end, the blanket is preformed to provide this shape.

Referring again to FIG. 3, on the inside surface of blanket 24 there is mounted a broken track comprising three sections 32, 33 and 34 which extend generally along a common arc or radius of curvature, the blanket in the flat condition being the development of a cone. Each track section comprises a pair of spaced joggle members 35 which are secured to the blanket as by welding thereto. As may best be seen in FIG. 16, each member 35 has spaced slits 36 and 36' which extend alternately from oppoiste edges of the member through its longitudinal line of bend, thereby to avoid any appreciable flexure loss in the blanket due to the attachment of the joggle members 35 thereto. The tracks provide guides for sliding engagement with discs generally designated 37, FIG. 17, which form a part of actuating means subsequently to be described for expanding and contracting the blanket.

Figure 4:
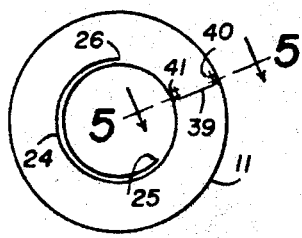
FIG. 4 is a diagrammatic view of the upstream end of the forward cone as viewed along the line 4—4 of FIG. 2.
Figure 6:
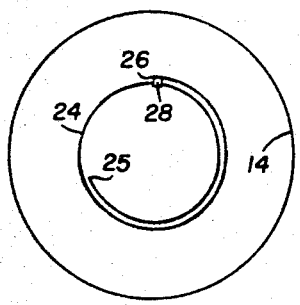
FIG. 6 is a diagrammatic end view of the downstream end of the forward cone as viewed along the line 6—6 of FIG. 2 which extends through the throat of the nozzle.
Figure 7:
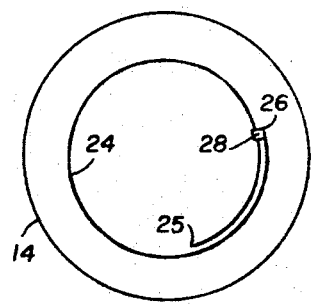
FIG. 7 is a view similar to FIG. 6 and showing the forward cone in its expanded position.

FIGS. 4, 6 and 7 diagrammatically disclose the condition of overlap of the edge portions of the wrapped blanket 24. FIGS. 6 and 7 particularly disclose comparatively the change in position of the inner and outer edges 25 and 26 upon circumferential expansion or unwrapping of the blanket from the position of FIG. 6 to the position of FIG. 7. It will be noted in this movement, that inner edge 25 has moved counterclockwise, and that outer edge 26 has moved clockwise, each through an angle of the order of 90° more or less.

Figure 5:
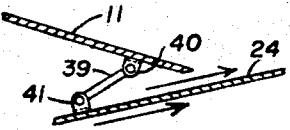
FIG. 5 is a sectional view taken along the line 5—5 of FIG. 4 and showing the linkage connection between the forward cone and the tail cone of the jet engine.

The unwrapping of blanket 24 involves movement of both its edges 25 and 26 because the blanket is restrained against rotation fore and aft and along its longitudinal centerline 38, also designated C, see FIGS. 3, 8, 9 and 13, while otherwise being urged to move radially outward by forces applied radially to the aforementioned track sections 32, 33 and 34 on the blanket. The mechanism for the securing of the blanket at its upstream end is disclosed in FIGS. 4 and 5 and comprises a U-shaped link 39 which is pivotally secured at its ends to a pair of brackets 40 and 41 which are secured, as by welding, to the engine tail cone 11 and blanket 24, respectively. As will be apparent from FIG. 5, link 39 prevents the blanket from rotating within the engine tail cone while permitting the same to unwrap therewithin and also to move axially thereof to a limited extent between the aforementioned end positions 27 and 27' of FIG. 2. The upstream truncated end portion of the conical wrap 24 which extends within the truncated tail cone 11 traps a portion of the cooling air so that the same is directed along and adjacent to both the inner and outer surfaces of blanket 24, as indicated by the arrows in FIGS. 1 and 3.

A somewhat more sophisticated hinge linkage mechanism, generally designated 42, is employed for securing the blanket 24 against rotation at its downstream end, as may be seen from the disclosures of FIGS. 8 to 12. An elongated tube 43, best seen in FIG. 10, extends coaxially downstream from the engine tail cone 11 and is supported therewithin by spoke structure, not shown. A hydraulic or pneumatic actuator 44 is disposed within tube 43 and held against rotational and axial displacement therewithin by a pin 45 which is passed transversely through the tube and through an apertured lug 46 secured to the end of the actuator 44.

Pin 45 also passes through the ends 47 and 48 of a bifurcated link 49, FIG. 11, and the link is thus pivotally supported on the pin which is suitably held in position as by the washers 50 and cotter pins 51. Link 49 is secured pivotally to one end of link 52 having slotted ends. The other end of link 52 is pivotally connected to a bracket 53 which is secured, as by welding, to blanket 24. Bifurcated link 49 is constrained against rotation with respect to the nozzle axis by reason of its pivotal connection to tube 43, and the blanket by reason of its pivotal link connection with link 49 is likewise held against rotation about the nozzle axis. The linkage 49, 52, however, freely permits radial expansion of the blanket in the region of its longitudinal center line 38, or C, and also permits limited axial displacement of the blanket, as required to retain the downstream end 29 in the plane of the nozzle throat 14. It will be apparent that the linkage 49, 52 could be power driven, if desired, to implement the radial expansion and contraction of blanket 24 in the region of its centerline 38, or C.

Figure 3:
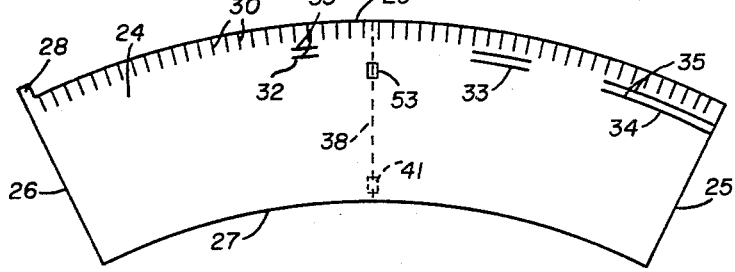
FIG. 3 is a fragmentary developed view of the blanket employed in the forward cone construction, the inside surface thereof being disclosed.

It will be recalled in connection with the description of FIG. 3, that track sections 32, 33 and 34 are located just upstream from the slits 30 in blanket 24 and, as disclosed in FIGS. 10, 15, 16, 18 and 30, respectively provide channels for sliding engagement with discs 37, there being one disc for each channel track section. Each of the discs, as best seen in FIG. 17, is a composite of two thin tapered metal discs 54 and 55 which are countersunk at their centers. Discs 54 and 55 are brought together as shown with their countersunk openings facing inward to form a socket for ball 56. After the ball is inserted in the socket, discs 54 and 55 are secured together, as by welding. Ball 56 is in the form of a shoulder screw having a reduced threaded end portion on a shank 57. Ball 56 has a neck which extends through the central opening in disc 55 and terminates in an enlarged shoulder portion 58.

As best seen in FIGS. 15 and 18, ball shank 57 extends through an arm 59 which forms a part of one of two halves of a centerless hinge generally designated 61. Arm 59 has a depending bracket 60 which carries a pinion 62 and a roller 63 disposed in parallel spaced relation, as shown. Pinion 62 and roller 63 are rotatively supported on shouldered pins 64 which are secured, as by riveting, to bracket 60. A ring gear sector 65 which forms part of the other half of centerless hinge 61 engages pinion 62 and is maintained in engagement therewith by roller 63. As may best be seen in FIG. 18, the roller has a central groove 63' in which the sector 65 moves to thus prevent the gear sector from sliding longitudinally with respect to its pinion and out of meshed engagement therewith. A nub 65' on the end of sector 65 limits the extent of the hinged movement between the parts as the nub moves to engage roller 63, as depicted by the dashed lines in FIG. 30.

Figure 9:
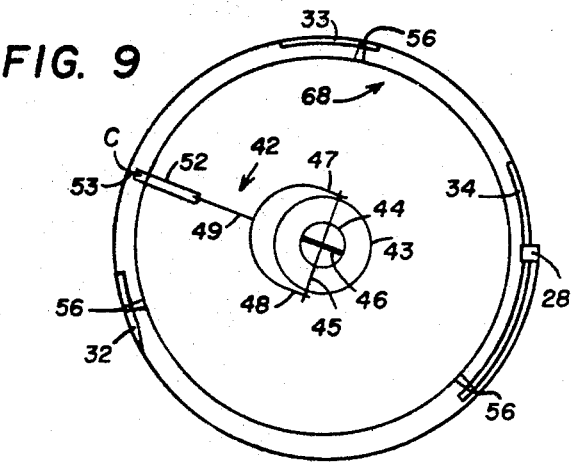
FIG. 9 is a view similar to FIG. 8 and showing the forward cone in its expanded position.

Ball shank 57 also passes through the center of links 66 and 67 which form a part of an endless lazy tongs, or ring tongs, generally designated 68, FIGS. 8 to 10. As best seen in FIG. 15, washers 69 are disposed on each side of members 66 and 67 to facilitate pivotal movement between them as well as to provide for free pivotal movement of arms 59, as required, to ease the circumferential expansion of cones 22 and 23 in coupled relation to each other.

An angle bracket 70 is secured to ball shank 57 by a nut 71. A link 72 having bifurcated or forked ends is pivotally secured to bracket 70 as by the pin 73 and similarly at its other end, FIG. 10, by a pin 73 to an ear 75. Ear 75 is secured to a collar 76 which is slidably mounted on tube 43. A second ear 75 on collar 76, spaced adjacent the first mentioned ear 75, is similarly pivotally connected to the forked end of a piston 77 for hydraulic actuator 78. Actuator 78 has an apertured lug 79 disposed between a pair of spaced apertured ears 80 and pivotally secured thereto as by a pin 81, ears 80 being secured, as by welding, to tube 43.

It will be understood that two, or more, circumferentially spaced actuators 78 may be employed to drive collar 76, and that three circumferentially spaced links 72 and associated ball supports 56 are employed to expand and contract blanket 24, as is apparent from the disclosure of FIGS. 8 to 10 wherein the ball supports are disclosed in operative relation to their respective track sections 32 to 34. As ball supports 56 move radially outward from their positions in FIG. 8 to their positions in FIG. 9, they also move, via their disc sockets 37, not shown in FIGS. 8 and 9, slidably within and to the opposite ends of their respective tracks upon circumferential expansion of blanket 24 to its expanded position (see also the dashed line position 24' of blanket 24 in FIG. 10).

Upon operation of actuators 78, pistons 77 thereof are withdrawn into their cylinders, and collar 76 is thus moved toward the actuators. Links 72 are thereby moved to their dashed line positions 72', FIG. 10, to thus expand the ring tongs from the closed position designated 68 to the open position designated 68'. As may clearly be seen from the ring tongs in its expanded position 68', the same comprises a plurality of pairs of links such as 66' and 67' which are pivotally secured at their centers as at 82' and similarly pivotally secured at their ends as at 83' and 84' to the adjacent pair of links on each side.

The overlapping edge portions of blanket 24, in practice, lie in face adjacency and tend to form a seal therebetween. However, as may be seen in FIGS. 19 and 20, a resilient seal 85 of very thin metal which is joggled, or S shaped, as shown, preferably is secured to the outer blanket edge portion by welding as at points 85' spaced from and along edge 26. The outer edge portion of seal 85 is then arranged to bear against the subjacent blanket surface extending along edge 26. The position of the seal is thus such as a respond to the pressure of the emitting gases thereon in a manner tending further to seal the overlapping edge portions of the blanket.

Referring again to FIG. 2, and also to FIGS. 14 and 24, the rear cone structure 23 comprises a plurality of longitudinally extending sheet metal leaves or petals 86 which are disposed in overlapping relation from petal to petal around the periphery of the cone. The petals are preformed to provide the requisite cross sectional and longitudinal curvature required in the unitary cone structure such as the cross sectional exit positions 20, 20' and 20'' of FIG. 1 (see also FIGS. 25 and 29). The petals are also preformed to provide the longitudinally curved terminal surface portion 21 of cone 23, also aforementioned with reference to FIG. 1. The structural condition of overlay of the rear cone leaves 86 is further apparent in FIGS. 14 and 24, a specific leaf 86A, for example, having sides $a$ and $b$ and ends $c$ and $d$. The true shape of petal 86A, however, is obscured in FIGS. 14 and 24 for the reasons that the sides $a$ and $b$ and the ends $c$ and $d$ are neither parallel nor of equal length, and the sides $a$ and $b$ further differ in that only the side edge $b$ lies within a radial plane through the nozzle axis. Edge $b$ for each of the petals 86 remains within its radial plane notwithstanding radial expansion and contraction of either or both of the upstream and downstream ends of the petals. The petal support mechanism, hereinafter to be described, assures that the petals, that is, the edge $b$ of each petal, moves within its radial plane through the nozzle axis for the various possible modulation positions of the rear cone. Each petal edge $b$, moreover, is turned inwardly in a rib configuration, and this ribbed portion extends along the radial plane to provide longitudinal stiffness for the petal.

The true shape of petal 86A is disclosed in FIGS. 21 to 23 wherein the perimeter $a$, $b$, $c$ and $d$ is identified. It will be noted in FIG. 21 that the petal widens from fore to aft and that, whereas upstream end $c$ is substantially normal to edge $b$, downstream end $d$ curves outwardly therefrom. Petal end $c$ is thus able to align with and face the downstream end 29 of blanket cone 24, as is apparent from the disclosures of FIGS. 14 and 30. Petal end $d$ is curved outwardly in an amount sufficient to retain all points in end $d$ within the exit plane of rear cone 23 when in its closed position, this being the position shown in FIGS. 14 and 24 wherein the downstream end portion of each leave petal 86 has its greatest overlap and circumferential curvature. Each end portion $d$, moreover, has a longitudinal curvature 21', FIG. 21, which gives the rear cone 23 its aforementioned reentrant curvature 21.

The radial movement of each of the petals 86 is clearly apparent from the showing of FIG. 29 wherein edges $b$ of petals 86B and 86C, for example, are disclosed as moving along the radial lines 87 and 88, respectively, as the petals move from the closed downstream cone position 20 to the intermediate modulation position 20' and thence to the maximum petal expanded position 20''. The condition of overlap of the petals is also apparent, it being noted that in position 20'', petal edge $a$ of petal 86C'' lies directly above edge portion $b$ of petal 86B'', there being only enough overlap between the adjacent petals to provide for continuity of the cone peripheral surface in relation to the continuous outer nozzle surface 17, and to provide adequate support of the petal edge portion $a$ on the subjacent petal edge portion $b$. In the intermediate modulation position 20', the overlap between adjacent petals increases somewhat, and in the fully closed position 20, the overlap of the petals has increased such that in the region $b$ of each petal, the pile up or overlap is four petals deep. It will be noted that petal 86D is the only petal which appears full width in the closed position 20 of FIG. 29.

The condition of overlap of petals 86 at their upstream ends is apparent in FIGS. 27 and 28 wherein the petals in their expanded position of FIG. 28, although having a minimum overlap between adjacent petals, present a continuous peripheral surface for hinge-coupled-engagement with the blanket 24. In the closed position of FIG. 27, the overlap between adjacent petals becomes substantial. As in the case of the downstream ends of the petals, the extent of overlap from petal to petal is unlimited. As otherwise expressed, the spiral dimension $a$ to $b$ of each petal is unlimited. However, the extent to which the cone 23 may be closed at the throat is limited by the space taken up by the centerless hinge mounting brackets 91 which would be disposed side by side at the full limit of closing.

The radial movement of each of the edges $b$ of petals 86 is accomplished at their upstream ends by means of the aforementioned centerless hinges 61 which respectively connect the upstream ends of the petals to the blanket 24. Radial movement of the downstream ends of petal edges $b$ is accomplished by means of a ring tongs support 90 for the downstream ends of the petals, see FIGS. 24 and 25.

Referring now to FIGS. 10, 15, 21 to 23 and 30, it will be seen that gear sector 65 of centerless hinge 61 is a part of the aforementioned mounting bracket 91 which may, for example, be cast integrally with the gear sector. As may best be seen in FIGS. 15 and 30, bracket 91 for each petal 86 is disposed slightly downstream of petal end $c$ and extends downstream along petal edge $b$, FIGS. 21 and 23, being secured to the petal in any suitable manner, as by welding. As best seen in FIGS. 21 and 23, each petal also has a pair of overlapping thin metal air scoop members 92 and 93 secured thereto, as by welding. Scoop 93 may also, in part, be secured in position by being interposed as shown in FIGS. 15 and 30, between the petal and its mounting bracket 91.

As best seen in FIGS. 10, 15 and 30, the end portion $c$ of each petal 86 is curved inwardly somewhat, and the air scoops 92, 93 are similarly curved and extended to pick up the cooling air which is directed adjacent to and along the inner surface of blanket 24, as by the funnel shaped deflector member 43″ which is supported on and secured to tube member 43, FIG. 10. The air is thus directed through the annular opening between blanket 24 and deflector 43″, as depicted by the arrow extended therebetween, and thence passes along the inner surface of the blanket to the scoop members 92, 93 which split the cooling air stream, a portion thereof passing adjacent to and along the inner surface of the petals 86, and the remaining portion passing, as indicated by the joggled arrow in FIGS. 1, 10 and 15, through the annular opening between the end 29 of the blanket and the adjacently disposed ends $c$ of the leaves, see also FIG. 30. An air film is thus caused to move along and adjacent to the external surface 20 of the leaves 86, as depicted in FIGS. 1, 10 and 15 by the aforementioned joggled arrow.

The three ball supports 56 for blanket 24, FIG. 8, are spaced 120° apart on their ring tongs support 68. The hinge arms 59, FIGS. 15 and 18, aforedescribed in association with ball supports 56, may or may not be associated therewith in every instance, depending on the number of petals 86 employed. In the instant case, wherein 20 petals are disclosed, only one of the three ball supports could serve as a pivot for the petal support arms 59, the remaining arms 59 being pivotally secured as by a shoulder screw 89, FIG. 30. Screw 89, like ball screw 56, employs spacing washers 69 and a retaining nut 71. When the number of petals employed is a multiple of 3, three of the hinge arms 59 therefor may be pivotally supported by all three ball supports 56. It will be understood, moreover, that the ball supports 56, and their actuating arms 72, may be located on the ring tongs 68 at pivotal points thereon disposed intermediate the pivotal supports for arms 59, in which case, all of the arms 59 would be mounted as in FIG. 30.

It will further be understood that when more than three ball connections with blanket 24 are required, more than one ball 56 may be employed at each of the three equispaced points, that is, three sets of ball supports may be employed in two possible arrangements. In one arrangement, the ball supports of each set are clustered together as a group and aligned circumferentially for sliding movement all in the same track. In an alternative arrangement, the ball supports in each set may be aligned longitudinally for sliding movement each in a separate track, the multiple tracks required for each set in this case extending in mutually spaced parallel relationship.

Ring tongs support 90, FIGS. 24 and 25, for the exit end of rear cone 23, has construction similar to that of ring tongs support 68 for blanket 24 and the forward end of the rear cone petals 86. Ball supports 94, similar to ball support 56, but having the ends thereof riveted over as depicted at 95, FIG. 24, are pivotally held to the petals 86 by sockets formed, in part, by the edges $b$ of the petals and in part by socket members 37′ which are secured, as by welding, to the petals. Socket members 37′ may have any configuration suitable for the purpose, each member, for example, may comprise a disc-portion of socket member 37, the disc-portion being large enough to form a socket for ball 94 and to interfit against side $b$ of the petal.

Three of the ball supports for petals 86 are designated 94′ and are equispaced apart by 120°. Each support 94′ carries a bracket 70, FIG. 24, which is held in position on the support by a nut 71, each support 94′ having shouldered, threaded shanks similar to supports 56. Forked rods 96 are pivotally secured to brackets 70 as by pins 97, and the other ends of rods 96 are similarly pivotally secured by pins 98 to ears 99 formed on a collar 100. Collar 100, FIGS. 10, 25 and 26, is secured to the piston rod 101 for a piston 102, FIG. 10, which forms a part of the aforementioned actuator 44.

When piston 102 is driven from its retracted position shown in FIG. 10, arms or rods 96 are moved downstream and radially outward to their dashed line positions 96′, FIG. 25, to thus expand the petals 86 and move the rear cone to its fully expanded position 20″. It may be desirable in some cases to employ one or more intermediately positioned ring tongs such as depicted by the dashed lines 103, FIGS. 10 and 25, and these intermediate ring tongs may be driven in the manner of support 90 or, alternatively, may merely be secured to the petals 86 to partake of their expansion and contraction.

It will now be apparent that the actuating means for the twin-cone structures 22 and 23 is conveniently and compactly disposed entirely within these structures coaxially therewith. Axially disposed support tube 43 may readily be supported rigidly and adequately on the engine tail pipe structure 8, 11 and may readily be extended, as required, through the tail cone 11.

Support tube 43, moreover, conveniently houses actuator 44 internally thereof and the actuators 78 externally thereabout in a mounting arrangement in which the actuators 78 and 44 move in opposite directions to expand their respective ring tongs 90 and 68, thereby to effect a static balance between the twin-cone structures to thus tend to restrain the same in axial position relative to the datum throat plane of the nozzle system notwithstanding radial movements of the structures in either or both of the throat and exit planes.

Support tube 43, furthermore, has the aforedescribed function of providing an antitorque arrangement for preventing rotation of the twin-cone structures about their common axis. It will be recalled that unitary rotation of the wrap structure 22 is prevented by the swing-hinge connection of its longitudinal center line to tube 43, and unitary rotation of the petal structure 23 is prevented by the ring tongs 68 and 90 which are secured against unitary rotation by reason of their respective link driving connections 72 and 96 with the tube mounted actuators 78 and 44.

In the modified nozzle of FIG. 31, tube 43 is extended as depicted 43′ to the exit plane of the nozzle and terminated with a cone-shaped exit fairing 104 to thus give the rear cone 33 an optimum termination for its fully closed position. Tube 43 conveniently may have longitudinal slots, not shown, for extension of the rods 96 therethrough as required for actuation of the ring tongs 90.

From the foregoing, it should now be apparent that area modulation methods and apparatus for use with convergent-divergent nozzle systems have been provided which are well adapted to fulfill the aforestated objects of the invention. It will be appreciated, moreover, that novel structures, mechanisms, and methods of manipulation of the same have been employed to effect the expansion and construction of the composite inner duct surface, 19, 20 provided by the twin-cone structures 22 and 23.

Wrap 24, for example, geometrically represents a truncated cone duct of variable cone angle and configuration. That is to say, the geometrical shape of the duct may be changed, or the duct may simply be enlarged or reduced in size by differentially or equally varying the diameters at the ends of the truncated cone wrap.

The wrap is prepared by cutting a sheet of material into a form representing the development of a truncated cone. The specific development form selected is made to be a suitable compromise between the precise forms required for the end limit configurations of the wrap. Thus, for example, in the case of wrap 24, which must move between the end limit configurations 19 and 19' of FIG. 1, the developmental form disclosed in FIG. 3 represents a compromise in which the composite annular track comprising the track elements 32, 33 and 34 will shift axially somewhat from its true geometrical plane normal to the cone axis, as the wrap is expanded and contracted between the end limit positions depicted on FIGS. 8 and 9.

This deviation or axial shift of the composite track due to the compromise is further minimized by restricting the wrap at its longitudinal centerline 38 to swinging movement in a radial plane through the cone axis, as aforedescribed. The longitudinal centerline thus does not rotate, and substantial circumferential movement is restricted to the overlapping edge portions of the wrap, both of which move so as to divide the required movement between them.

The effect of the composite track deviation is additionally minimized, as may be appreciated from the showing of FIG. 3, by placing two of the track elements 32, 33 close to, and on opposite sides of the longitudinal centerline 38, to thus minimize the lengths of these track elements and the circumferential movements thereof with respect to their coacting discs 37 and ball supports 56.

The composite track deviation, as thus minimized, is readily accommodated by the spacing between the joggled track members 35, FIG. 16, the spacing being adequate to permit the required lateral deviational shift between the track and disc 37 while also providing requisite structural integrity with respect to the mechanical joint formed therebetween.

It will be apparent also that the end 29 of wrap 24 will deviate somewhat from the datum throat plane, since only the downstream end of the longitudinal centerline 38 will maintain this position precisely, except when the cone is modulated to an intermediate position in which its configuration conforms to the compromised developmental form. In the extreme limit positions 19, 19', FIG. 1, the terminal portions of end 29 in the region of edges 25, 26 of the wrap will have the greatest deviation. This deviation, however, is minimized, as aforedescribed, and the tab 28 is readily elongated, as required, to retain the overlapping edge portions in coupled engagement.

There is thus disclosed a basic method of forming a unitary truncated cone duct of variable geometrical configuration which comprises the steps of shaping a sheet of suitable material as the development of a truncated cone which is a compromise between developments corresponding geometrically to the truncated cone configurations desired ideally at the end limits of the duct variation, wrapping the shaped sheet into a truncated cone with overlapping edge portions, restricting the wrapped cone in the region of its longitudinal centerline for movement in a radial plane through the axis of the cone, circumferentially varying the extent of overlap between said edge portions to vary the size of the cone, and equally or differentially varying the extent of overlap at the open ends of the cone duct to vary the geometrical shape thereof.

Petal structure 23, like the wrap 24, geometrically represents a truncated cone duct of variable cone angle and configuration which may either be changed in shape or size by differentially or equally varying the diameters at the ends of the duct. Cone structure 23, however, is less limited in regard to the extent to which its geometrical configuration may be changed. As disclosed comparatively in FIGS. 1 and 2, for example, wrap cone 22 retains the general configuration of a divergent cone in both of its limit positions 19 and 19' whereas petal cone 23 has the configuration of a convergent cone in its fully closed limit position 20 and of a divergent cone in its fully opened position 20". In possible intermediate positions, not disclosed, petal duct 23 may also form a cylindrical extension of duct 22.

In other possible arrangements and applications of duct 23 as a variable flow channel device, leaves 86 may be formed at both ends with considerable spiral interleaving, the central portion, however, being narrowly formed. With such an arrangement, either end may have the range of expansion and contraction as disclosed in the exit plane. In another possible arrangement, the full spiral interleaving may extend over the full length of the petals, in which case, the duct may be varied as a cylinder through the full diametrical range such as disclosed in the exit plane. Still other arrangements are possible as by coupling two such structures end to end, as where it is desired to invert a divergent/convergent form, such as depicted by the configuration 19, 20 in FIG. 1, to a convergent/divergent form, or vice versa.

There is thus disclosed a basic method of changing the geometrical size and shape of a duct which comprises the steps of spirally interleaving a plurality of sheet members each with one of its longitudinal edges extending within a radial plane through the axis of the duct and with said longitudinal edges of the members spaced equally around the periphery of the duct, moving said edges each within its radial plane through the duct axis, and moving the ends of the edges equally or differentially to effect the flow channel configuration desired for the duct.

The centerless-hinge structure 61 provides a means of hinge-coupling the twin-cone structures together for pivotal movement of each petal 86 about an axis which may be located with precision in relation to the terminal downstream end 29 of the upstream cone 22 without actually requiring structure at the axis whereby an unobstructed annual opening may be provided, as disclosed, between the hinge-coupled structures for the passage of cooling air therebetween. At the same time, a pivotal joint is provided having structural integrity capable of maintaining positions of pivotal adjustment of the hinge-coupled structures. The ring gear segment is the key to this centerless-hinge action, and the opening at the hinge axis between the hinge-coupled members may be controlled as a function of the swinging movement between the members. Thus, for example, the segment may be arcuately formed so as to widen the gap between the hinge-coupled elements as the hinged movement therebetween increases.

The hereindisclosed centerless method of hinging a pair of members together thus basically comprises the steps of disposing the members in spaced relation defining a hinge axis region therebetween, interconnecting the members for rolling engagement of a surface of the one member on a surface of the other at a point disposed in predetermined space relation from said hinge axis region, and extending said engaging surface of one of the members along an arcuate path having a predetermined curvature with respect to said hinge axis region, thereby to control the spacing between the members as said engaging surfaces of the same are rolled one on the other to hingedly move the members.

From the foregoing, it should also now be apparent that an improved nozzle system has been provided which affords increased average nozzle propulsive efficiency over the total operating range. In summary, the increased efficiency derives mainly from the use with a convergent/divergent De Laval type nozzle duct of a compatible, coaxially oriented, inner twin-cone duct structure having provision for modulating the area of flow independently in the throat and exit planes of the nozzle system. Among its various advantages and features, such a system affords advantageous flow profiles, smooth flow transistion surfaces, reduction in envelope length, and economies in weight, space and drag, particularly for high speed installations, all of which features, improvements and advantages are manifested in the form of increased propulsion efficiency.

Even small increases in nozzle propulsive efficiency provide magnified gains in overall propulsion efficiency and are therefore of paramount consideration. This may be illustrated mathematically for a high-speed nozzle system by resort to an example involving the formula, $$F_N = \eta F_G - D$$

where
$F_N$ = net thrust,
$\eta$ = nozzle propulsive efficiency
$F_G$ = gross thrust, and
$D$ = total drag loss.

Assuming a representative engine installation in which the nozzle propulsive efficiency is 98% and the total drag loss is of the order of 75%, numerical values such as 3 and 4 units may be assumed for the total drag loss and gross thrust, respectively. Assuming further that the propulsive efficiency of the assumed representative installation is increased by 1% to 99% as by incorporation of various features of the present invention, the overall gain in propulsion efficiency may be calculated by applying the assumed values to the aforesaid formula, as follows:

$$\frac{F_{N.99}}{F_{N.98}} = \frac{.99 \times 4 - 3}{.98 \times 4 - 3} = 1.04$$

from which the overall propulsion efficiency gain is shown to be 4%. Thus, a 1% gain in propulsive efficiency is shown to produce a 4% gain in overall propulsion efficiency.

It will be understood that while preferred embodiments and examples of this invention have been disclosed herein, other embodiments and modifications thereof are feasible to afford the full utility and results of which the present invention is capable. For example, the hereindisclosed modulatable twin-cone structure may also be employed for use with a modulatable outer duct structure, and therefore is not limited for use with a fixed profile outer duct, as disclosed herein. As another example, tabs similar to tabe 28 on blanket 24 may be employed and edge $d$ adjacent to side $a$, FIG. 21, of each leaf 86 to thus retain the overlapping leaf portions in assembled spiral relation, in the manner best seen in FIG. 29.

It will be understood therefore that these and other examples, embodiments, and modifications of the invention such as applications to rocketry, both liquid and solid propellant types, and applications to channel flow devices in various fields, may suggest themselves to those skilled in the art to which the invention most nearly appertains without departing from the scope of the invention as defined in the appended claims.

What is claimed and desired to be secured by Letters Patent of the United States is:

1. In a jet engine nozzle system for high speed areospace vehicles, the combination of means defining inner and outer coaxial duct surfaces for the passage of an efflux gas therebetween, at least one of said inner and outer duct surfaces having a profile configuration defining throat and exit planes, and means disposed respectively within the zones of said throat and exit planes for independently modulating the area of flow of said efflux gas within said throat and exit planes, said outer duct surface having a convergent/divergent profile configuration defining said throat and exit planes, and said inner duct surface being expandable and contractable in the zones of said throat and exit planes to effect said area modulation.

2. In a jet engine nozzle system as in claim 1, said outer duct surface being fixed and having a reentrant portion which terminates in said exit plane.

3. In a jet engine nozzle system as in claim 2, said inner duct surface having an end portion which terminates in said exit plane and conforms aerodynamically with said reentrant portion of the outer duct surface.

4. In a jet engine nozzle system as in claim 1, said inner duct surface comprising a unitary wrap having circumferentially overlapping edge portions and a downstream end portion which terminates in said throat plane, and said inner duct surface also comprising a plurality of circumferentially overlapping leaves, each of which extends longitudinally between said throat and exit planes and has a longitudinally extending edge portion movable within a radial plane through the axis of said nozzle duct surfaces.

5. In a jet engine nozzle as in claim 4, each of said leaves being hinge-coupled to said wrap for expansion and contraction therewith.

6. In a jet engine nozzle as in claim 5, said hinge-coupling between each of said leaves and said wrap comprising a centerless hinge.

7. In a jet engine nozzle as in claim 6, each said centerless hinge comprising a ring gear segment secured to the leaf individual thereto and having its center of curvature disposed at the junction of said leaf and wrap, a pinion gear supported on the wrap for meshed engagement with said ring gear segment, and a roller member supported on the wrap and positioned so as to urge said pinion into said engagement with the gear segment.

8. In a jet engine nozzle as in claim 1, said inner duct surface comprising a unitary wrap having circumferentially expandable and contractable overlapping edge portions and a central longitudinally extending portion restricted to expansion and contraction within a radial plane through the axis of said nozzle duct surfaces.

9. In a jet engine nozzle as in claim 1, said inner surface comprising a plurality of longitudinally extending and circumferentially overlapping leaves, each having a radially ribbed longitudinally extending edge portion which is movable within a radial plane through the axis of said nozzle duct surfaces.

10. In a nozzle system for a jet engine having a tail pipe and a tail cone coaxially disposed therewithin for the passage of an efflux gas therebetween, the combination of a convergent/divergent outer nozzle duct connected to the tail pipe and forming an extension thereof, and an expandable and contractable inner nozzle duct connected to the tail cone and forming an extension thereof, said inner nozzle duct being coextensive coaxially with convergent/divergent portions of said outer nozzle duct and independently expandable and contractable within the throat and exit planes thereof.

11. In a nozzle system as in claim 10, and wherein the jet engine has a source of cooling air and passes the same through the tail cone, said inner duct having means for directing the cooling air from the tail cone and adjacent to and along the inner and outer surfaces of said inner duct.

12. In a nozzle system for a jet engine having a tail pipe structure including a tail pipe and a truncated tail cone disposed coaxially therewith for the passage of an efflux gas therebetween, the combination of a convergent/divergent outer nozzle duct defining throat and exit planes and connected to the tail pipe as an extension thereof, an expandable and contractable twin-cone inner duct structure disposed coaxially within said outer duct and having one end thereof disposed within said truncated tail cone and the other end terminated in said exit plane, and axially disposed means supported on said tail pipe structure for expanding and contracting said twin-cone duct structure independently within said throat and exit planes.

13. In a nozzle system as in claim 12, said expanding and contracting means comprising a tube secured to said tail pipe structure and extended through said tail cone and substantially coextensively within said twin-cone structure, and a plurality of longitudinally extended actuators mounted on said tube and operatively coupled to said twin-cone duct structure.

14. In a nozzle system as in claim 13, said twin-cone structure comprising a unitary conical wrap and a plurality of interleaved petal members each hinge-coupled to said wrap, means securing the longitudinal central portion of said wrap to said tail cone and to said tube for movement in a radial plane through the nozzle axis, a first ring tongs support having a plurality of circumferentially spaced sliding connections with said wrap, and a second ring tongs support having a plurality of circumferentially spaced pivotal connections with said petal members respectively.

15. In a nozzle system as in claim 14, said hinge-coupling between said petal members and said wrap romprising a plurality of centerless hinges individual to said petal members and each comprising an arcuate gear segment secured to the petal member individual thereto, a bracket pivotally secured to said first ring tongs support, a pinion rotatively supported on said bracket for meshed engagement with said gear segment, and a roller rotatively supported on said bracket for urging said gear segment into said meshed engagement with said pinion.

16. In a nozzle system as in claim 15, said actuators respectively comprising driving links pivotally interconnected with said first and second ring tongs supports.

17. In a nozzle system as in claim 16, said driving links being arranged to move their respective ring tongs support connections radially as the actuators are moved longitudinally, thereby to move a longitudinally extending edge portion of each of said petal members within a radial plane through the nozzle axis, and said actuators being moved in opposite directions, thereby to effect a static balance between said first and second ring tongs supports.

18. In a nozzle system as in claim 13, said tube having a cone shaped terminal exit fairing for said twin-cone structure in fully contracted position.

References Cited
UNITED STATES PATENTS

| | | | |
|---|---|---|---|
| 2,926,489 | 3/1960 | Halford et al. | 239—127.1 |
| 2,974,477 | 3/1961 | Egbert et al. | 239—265.17 |
| 2,984,068 | 5/1961 | Eatock | 239—127.3 |
| 2,999,354 | 9/1961 | Gallo et al. | 239—127.3 |
| 3,237,864 | 3/1966 | Taylor et al. | 239—265.17 |

EVERETT W. KIRBY, *Primary Examiner.*